(12) United States Patent
Faronius et al.

(10) Patent No.: US 10,448,275 B2
(45) Date of Patent: Oct. 15, 2019

(54) NETWORK NODE AND METHOD PERFORMED THEREBY FOR SUPPORTING VOIP SERVICE OF WIRELESS DEVICE

(71) Applicant: Telefonaktiebolaget LM Ericsson (publ), Stockholm (SE)

(72) Inventors: Carola Faronius, Järfälla (SE); Anders Christensson, Älvsjö (SE); David Sandberg, Solna (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 86 days.

(21) Appl. No.: 15/557,155

(22) PCT Filed: Mar. 31, 2015

(86) PCT No.: PCT/SE2015/050389
§ 371 (c)(1),
(2) Date: Sep. 11, 2017

(87) PCT Pub. No.: WO2016/159842
PCT Pub. Date: Oct. 6, 2016

(65) Prior Publication Data
US 2018/0049058 A1    Feb. 15, 2018

(51) Int. Cl.
*H04W 28/02* (2009.01)
*H04W 28/16* (2009.01)
(Continued)

(52) U.S. Cl.
CPC .......... *H04W 28/02* (2013.01); *H04L 1/08* (2013.01); *H04L 5/0064* (2013.01); *H04L 47/24* (2013.01);
(Continued)

(58) Field of Classification Search
None
See application file for complete search history.

(56) References Cited

U.S. PATENT DOCUMENTS 9,986,556 B1 * 5/2018 Zhou ............... H04B 7/2656
2005/0171984 A1 * 8/2005 Wang ............. H04W 72/0486
708/100

(Continued)

FOREIGN PATENT DOCUMENTS

CN      103546973 A    1/2014
WO    2013190364 A2    12/2013

OTHER PUBLICATIONS

Panasonic, "Latency reduction for C-Plane activation", 3GPP TSG RAN WG2 #66bis, Jul. 27, 2009, pp. 1-2, R2-093850, Los Angeles, USA.
(Continued)

*Primary Examiner* — Lonnie V Sweet
(74) *Attorney, Agent, or Firm* — Sage Patent Group

(57) ABSTRACT

A network node and a method performed thereby for supporting VoIP service of a wireless device are provided. The network node is operable in a wireless communication network, and the method comprises, when a channel quality of a channel between the wireless device and the network node falls below a predetermined threshold: determining (110) QoS requirements with regard to GBR for services which the wireless device is currently using; determining (120) an achievable bitrate using TTI bundling; and determining (150) to enable TTI bundling of the wireless device based on the determined aggregated GBR requirement and the determined achievable bitrate.

17 Claims, 7 Drawing Sheets

(51) Int. Cl.
  *H04W 72/12*   (2009.01)
  *H04W 28/24*   (2009.01)
  *H04L 5/00*    (2006.01)
  *H04L 1/08*    (2006.01)
  *H04L 12/851*  (2013.01)
  *H04L 12/891*  (2013.01)
  *H04M 7/00*    (2006.01)

(52) U.S. Cl.
  CPC ......... *H04L 47/41* (2013.01); *H04W 28/0257* (2013.01); *H04W 28/16* (2013.01); *H04L 5/006* (2013.01); *H04M 7/006* (2013.01); *H04W 28/24* (2013.01); *H04W 72/12* (2013.01)

(56) References Cited

U.S. PATENT DOCUMENTS

2013/0343273 A1    12/2013  Barbieri et al.
2015/0063280 A1*   3/2015   Nan ..................... H04L 1/0006
                                                          370/329

OTHER PUBLICATIONS

ZTE, "Coverage improvement techniques for low cost MTC UEs", 3GPP TSG RAN WG1 Meeting #71, Nov. 12, 2012, pp. 1-9, R1-124829, New Orleans, USA.
NSN MTC, "UE Support for Coverage Enhancement Mode", 3GPP TSG RaN1#74bis, Oct. 7, 2013, pp. 1-3, R1-134515, Guangzhou, China.

* cited by examiner

NETWORK NODE AND METHOD PERFORMED THEREBY FOR SUPPORTING VOIP SERVICE OF WIRELESS DEVICE

TECHNICAL FIELD

The present disclosure relates to wireless communication and in particular to a network node and a method performed by a network node for supporting Voice over IP, VoIP, service of a wireless device.

BACKGROUND

In some wireless communication networks, packets are delivered using the Internet Protocol, IP. This means that also traditionally circuit switched services such as voice conversation will make use of fast scheduling and it is called Voice over IP, VoIP. In a typical VoIP arrangement a voice encoder on the transmitter side encodes the speech into packets with typical speech duration of 20 ms.

Since the delay budget for the delivery of speech frames is relatively tight, there is not much time for queuing or retransmissions in the scheduler. Often in a wireless system, the cell-edge wireless devices, which are the wireless devices probably experiencing the worst channel conditions, will limit the total system performance. In this context, a cell-edge wireless device is defined as a wireless device with such high pathloss that when transmitting at its maximum powers it cannot transmit a full speech frame without retransmissions and/or segmentation. For example, a VoIP wireless device located at the cell edge may require extensive retransmissions in order to transmit a voice frame. These retransmissions will lead to increased packet delay for the wireless device, but the retransmissions will also require system resources that will reduce voice quality for other wireless devices. A potential solution to this would be to split the voice frame into a number of segments, where each segment can be transmitted with a larger success probability. But since every segment needs a Radio Link Control, RLC, and Medium Access Control, MAC, header, the transmission of many small segments will result in increased header overhead, and the link efficiency will decrease due to this. In addition to this, the load on control channels will also increase since more segments needs to be scheduled and every segment requires a new PDCCH message.

SUMMARY

The object is to obviate at least some of the problems outlined above. In particular, it is an object to provide a network node and a method performed thereby for supporting VoIP service of a wireless device. These objects and others may be obtained by providing a network node and a method performed by a network node according to the independent claims attached below.

According to an aspect a method performed by the network node for supporting VoIP service of a wireless device is provided. The network is operable in a wireless communication network. The method comprises when a channel quality of a channel between the wireless device and the network node falls below a predetermined threshold: determining aggregated QoS requirements with regard to GBR for services which the wireless device is currently using. The method further comprises determining an achievable bitrate using Transmission Time Interval, TTI, bundling; and determining to enable TTI bundling of the wireless device based on the determined aggregated GBR requirement and the determined achievable bitrate.

According to an aspect, a network node for supporting VoIP service of a wireless device is provided. The network is operable in a wireless communication network. The network node is configured for, when a channel quality of a channel between the wireless device and the network node falls below a predetermined threshold: determining aggregated QoS requirements with regard to GBR for services which the wireless device is currently using. The network node is further configured for determining an achievable bitrate using TTI bundling; and determining to enable TTI bundling of the wireless device based on the determined aggregated GBR requirement and the determined achievable bitrate.

The network node and the method performed by the network node may have several possible advantages. One possible advantage is that it may be ensured that TTI bundling is only used when needed and when it is possible to fulfil service specific QoS requirements. Another possible advantage is that system resources may not be wasted on wireless devices that will fail to fulfil QoS requirements if switched to TTI bundling. In addition, highly prioritised services could be maintained of other, non-essential, services are degraded or terminated.

BRIEF DESCRIPTION OF DRAWINGS

Embodiments will now be described in more detail in relation to the accompanying drawings, in which.

DETAILED DESCRIPTION

Briefly described, a network node and a method performed thereby are provided for supporting a Voice over IP, VoIP, service of a wireless device. By determining aggregated Quality of Service, QoS, requirements with regard to Guaranteed Bit Rate, GBR, for services which the wireless device is currently using and achievable bitrate using Transmission Time Interval, TTI, bundling, the network node may ensure that the QoS requirements with regard to GBR may still be fulfilled when enabling TTI bundling for the wireless device.

In this disclosure, the non-limiting term wireless device is used. It refers to any type of wireless device that communicates with a radio network node in a cellular, wireless or mobile communication system. Examples of a wireless device are a User Equipment, UE, target device, Device to Device, D2D, machine type UE or UE capable of Machine to Machine, M2M, communication, Personal Digital Assistant, PDA, iPAD, Tablet, mobile terminals, smart phone, Laptop Embedded Equipped, LEE, Laptop Mounted Equipment, LME, USB dongles, vehicles comprising means for communicating with e.g. network nodes etc.

To alleviate some of the problems mentioned above, TTI bundling may be employed. When TTI bundling is enabled for a wireless device, an uplink grant for the wireless device will trigger uplink transmissions of the same data packet in a plurality of, e.g. four, consecutive TTIs. In the receiver, these transmissions may be combined using Hybrid Automatic Repeat Request, HARQ and get effectively four (the number of the plurality of TTIs) times the received energy for the same data packet. With this increase in received energy, the speech frame may be transmitted without extensive retransmission or segmentation leading to decreased packet delay.

The achievable throughput for a wireless device that is using TTI bundling may be very limited since the number of Physical Resource Blocks, PBRs, and Modulation and Coding Schemes, MCSs, that may be used may be limited. This implies that TTI bundling should only be used when needed, i.e. in bad radio conditions and that wireless devices will need to enable and disable TTI bundling depending on currently experienced radio conditions. Switching between the different TTI bundling modes may be based on a filtered Signal to Noise and Interference Radio, SINR, Signal to Noise Ratio, SNR, measurement, and/or Block Error Rate, BLER, measurements.

Figure 1A:
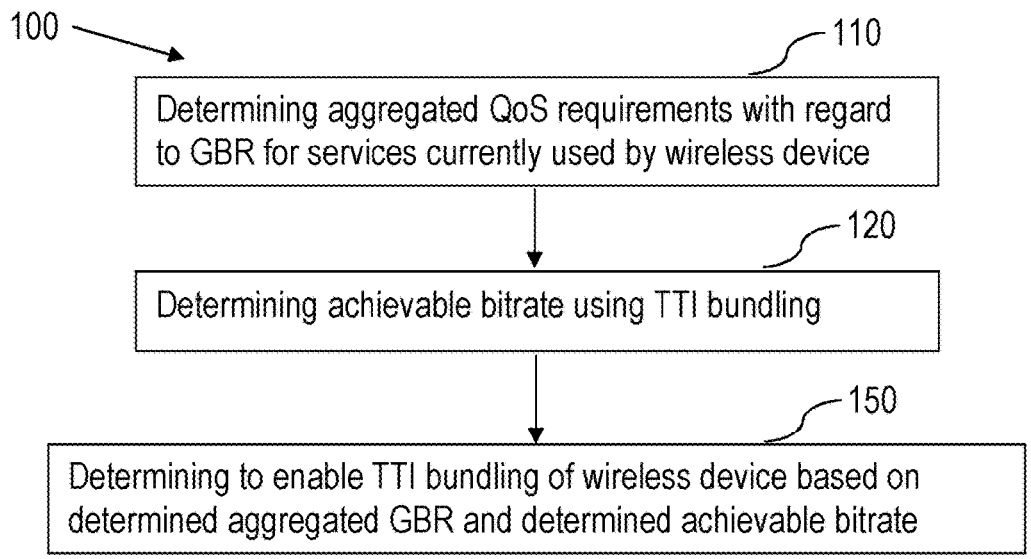
FIG. 1a is a flowchart of a method performed by a network node for supporting VoIP service of a wireless device, according to an exemplifying embodiment.

Embodiments of a method performed by a network node for supporting a Voice over IP, VoIP, service of a wireless device will now be described with reference to FIGS. 1a-1f. The network is operable in a wireless communication network. The method comprises as illustrated in FIG. 1a, when a channel quality of a channel between the wireless device and the network node falls below a predetermined threshold: determining 110 aggregated QoS requirements with regard to GBR for services which the wireless device is currently using. The method further comprises determining 120 an achievable bitrate using Transmission Time Interval, TTI, bundling; and determining 150 to enable TTI bundling of the wireless device based on the determined aggregated GBR requirement and the determined achievable bitrate.

The wireless device may have more than one service ongoing and while one or more services are ongoing, the wireless device may be moving about, resulting in varying signal quality and/or interference situation. In case the signal or channel quality deteriorates, e.g. if the Signal to Noise Ratio, SNR, or Signal to Noise and Interference Ratio, SINR decreases, then the network node may need to take certain actions in order to still support the service, or services, that the wireless device is currently using, whereof VoIP is one of those services, or the only service that the wireless device is currently using.

Generally, one bearer is established for each service between the wireless device and the network node. Different services may have different quality requirements, some services may be delay sensitive and some may not be delay sensitive for example. Quality requirements may be expressed as QoS, where a service may have a specific quality of service.

One example of a QoS realisation is GBR, wherein the QoS for a specific service may correspond to a minimum GBR. As stated above, the wireless device may be involved in more than one service at a time and each service may be associated with a respective minimum GBR. As the TTI bundling will limit the achievable throughput for each of the ongoing services, the network node determines the aggregated QoS requirements with regard to GBR for services which the wireless device is currently using. One example is that the network node sums the individual GBR for the respective services which the wireless device is currently using. Another example of QoS realisation is Minimum Bit Rate, MBR, which may be used in with the solution described herein.

The network node then determines the achievable bitrate using TTI bundling. Since TTI bundling comprises transmitting the same data packet in a number of consecutive TTIs, the wireless device may determine the achievable bitrate using TTI bundling before determining to enable, or switch to, TTI bundling.

Once the network node has determined the aggregated QoS requirements and the achievable bitrate using TTI bundling, the network node may compare the aggregated QoS requirements and the achievable bitrate using TTI bundling in order to ascertain that the aggregated QoS requirements with regard to GBR may be fulfilled even when TTI bundling is enabled. The network node may then determine to enable TTI bundling of the wireless device based on the determined aggregated GBR requirement and the determined achievable bitrate.

The method performed by the network node may have several possible advantages. One possible advantage is that it may be ensured that TTI bundling is only used when needed and when it is possible to fulfil service specific QoS requirements. Another possible advantage is that system resources may not be wasted on wireless devices that will fail to fulfil QoS requirements if switched to TTI bundling. In addition, highly prioritised services could be maintained of other, non-essential, services are degraded or terminated.

Figure 1B:
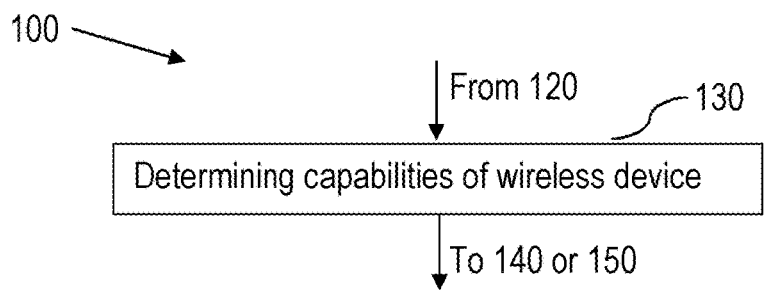
FIG. 1b is a flowchart of a method performed by a network node for supporting VoIP service of a wireless device, according to yet an exemplifying embodiment.

The method may further comprise, as illustrated in FIG. 1b, determining 130 capabilities of the wireless device, wherein determining to enable TTI bundling of the wireless device is also based on the capabilities of the wireless device.

Different wireless devices may have different capabilities, wherein different wireless devices may support different features and functionalities. Consequently, it is possible that not all wireless devices may support TTI bundling, different wireless devices may support different versions or releases of TTI bundling and thus the network node determines the capabilities of the wireless device to ensure that the wireless device supports TTI bundling. An example of how the network node determines if the wireless device supports TTI bundling is by receiving a signal from the wireless device comprising such information. An example of such a signal is the "noResourceRestrictionForTTIBundling" defined in 3GPP release 12.

For a wireless device not supporting TTI bundling, the feature of TTI bundling may not be enabled, or ordered, by the network node. However, if the wireless device supports TTI bundling, and the above conditions are met with regard to aggregated QoS requirements and achievable bitrate using TTI bundling, then TTI bundling may be enabled for the wireless device.

Figure 1C:
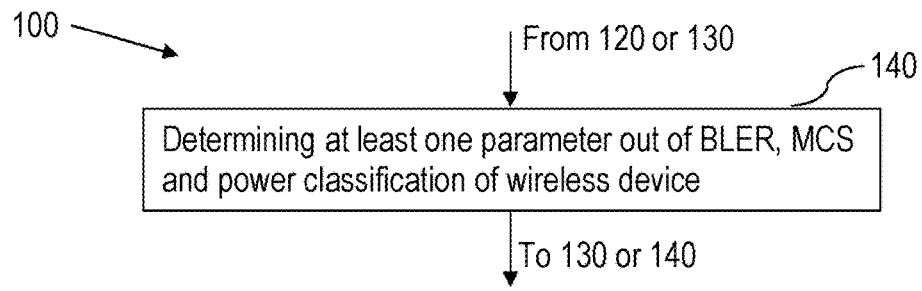
FIG. 1c is a flowchart of a method performed by a network node for supporting VoIP service of a wireless device, according to still an exemplifying embodiment.

Still further, the method may comprise, as illustrated in FIG. 1c, determining 140 at least one parameter out of BLER, Modulation and Coding Scheme, MCS, supported number of Physical Resource Blocks, PRBs, and power classification of the wireless device affecting the achievable bitrate, wherein determining to enable TTI bundling of the wireless device is also based on the determined at least one parameter.

As the wireless device moves about, the channel quality may change and there are several parameters that may be employed to compensate for a deterioration in channel quality. BLER, MCS supported number of PRBs and power classification of the wireless device are examples of parameters that may affect the achievable bitrate Thus, the network node may also further determine at least one parameter out of the exemplified parameters above as well as the previously described aggregated QoS requirements and achievable bitrate using TTI bundling, which parameter is taken into account when determining whether to enable TTI bundling of the wireless device or not.

In an example, determining 150 to enable TTI bundling of the wireless device comprises determining the TTI bundling mode to be enabled when the achievable bitrate is at least as high as the aggregated GBR requirement.

In case the aggregated GBR requirement, also referred to as aggregated QoS requirement with regard to GBR, is fulfilled by the TTI bundling mode, i.e. if the achievable bitrate is at least as high as the aggregated GBR requirement, the network node may determine to enable TTI bundling of the wireless device.

By enabling TTI bundling of the wireless device, the network node allows the wireless device to enter into TTI bundling mode, or activating TTI bundling mode.

In yet an example, determining 150 to enable TTI bundling of the wireless device comprises determining the TTI bundling mode to be enabled when the capabilities of the wireless device supports TTI bundling and optionally when the at least one parameter does not degrade the achievable bitrate to fall below the aggregated GBR requirement.

When the network node determines that the wireless device does not support TTI bundling, as described above by determining the capabilities of the wireless device, the network node may not enable TTI bundling for the wireless device. However, when the capabilities of the wireless device supports TTI bundling, the network node may determine to enable TTI bundling of the wireless device, granted that the achievable bitrate to fall below the aggregated GBR requirement. In this decision, the at least one parameter affecting the achievable bitrate may be taken into account.

Figure 2:
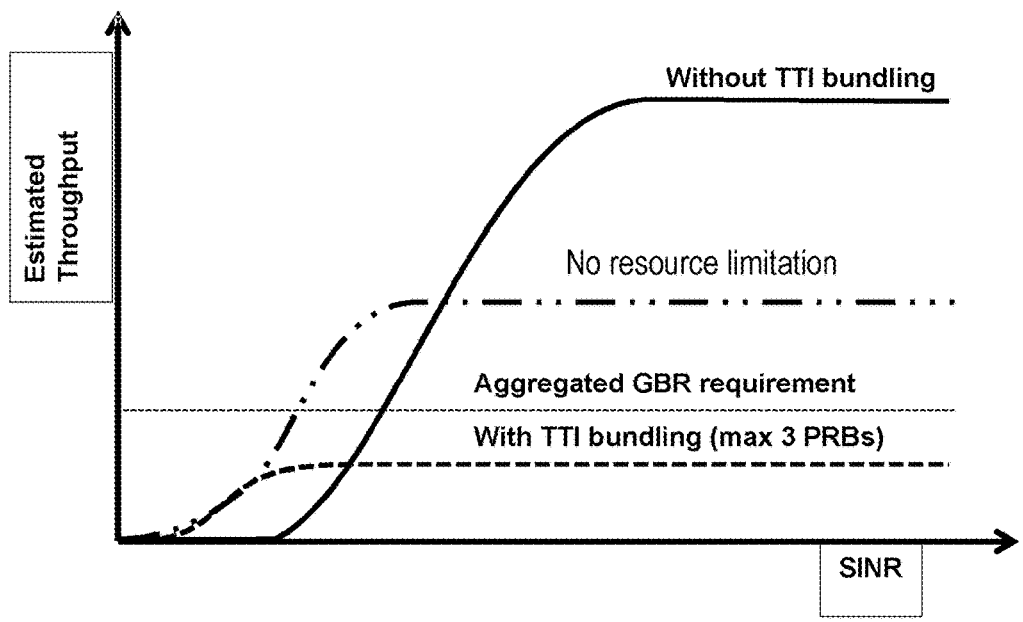
FIG. 2 is a graph illustrating estimated throughput as a function of channel quality.

There may further be different TTI bundling modes, corresponding to different number of supported PRBs, as is illustrated in FIG. 2, wherein two different modes are illustrated, TTI bundling with maximum 3 PRBs and with unrestricted PRBs, i.e. no resource limitation. The network node may determine which TTI bundling mode to enter based on achievable bitrate versus the aggregated GBR requirement; and also based on the capabilities of the wireless device. The wireless device may support one, TTI bundling modes depending on which release of 3GPP the wireless device supports. Consequently, the network node may base its decision of enabling the TTI bundling mode of the wireless device based on achievable bitrate versus the aggregated GBR requirement; and also based on the capabilities of the wireless device. Different 3GPP releases may support different number of PRBs in association with TTI bundling as is illustrated in FIG. 2.

Figure 1D:
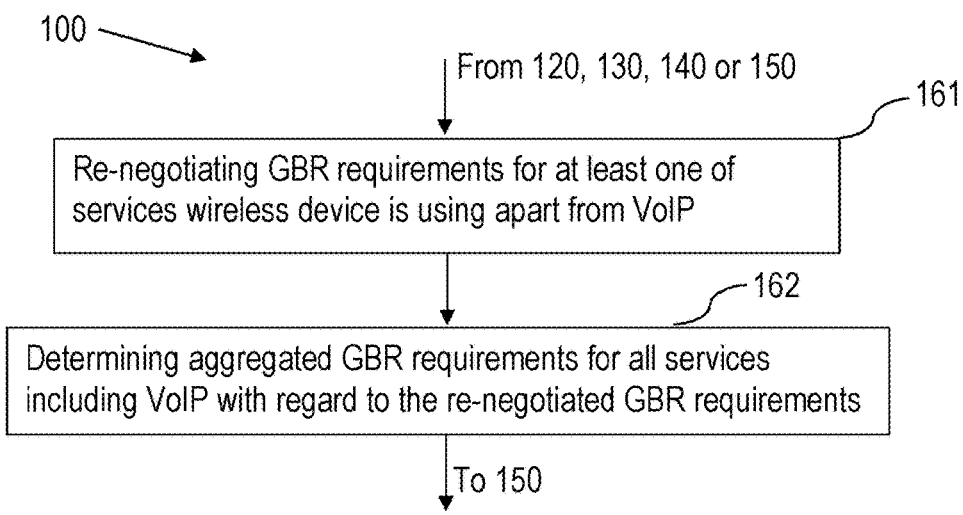
FIG. 1d is a flowchart of a method performed by a network node for supporting VoIP service of a wireless device, according to a further exemplifying embodiment.

The method may further comprise, as illustrated in FIG. 1d, when the achievable bitrate is below the aggregated GBR requirement, re-negotiating 161 GBR requirements for at least one of the services which the wireless device is using apart from the VoIP service, determining 162 aggregated GBR requirements for all services including the VoIP service with regard to the re-negotiated GBR requirements, wherein the TTI bundling mode is determined to be enabled when the achievable bitrate is at least as high as the aggregated GBR requirement for the re-negotiated GBR requirements.

Instead of determining not to enable TTI bundling mode if the achievable bitrate is below the aggregated GBR requirement, the network node may re-negotiate GBR requirements for at least one of the services which the wireless device is using apart from the VoIP service. As described above, generally each service is associated with a specific bearer, wherein the specific bearer is established having, or supporting, a minimum GBR. The network node may then re-negotiate the GBR requirements for at least one of the services which the wireless device is using apart from the VoIP service, i.e. re-negotiate the GBR requirements for at least one of the bearers that is/are established between the network node and the wireless device.

In case the GBR requirements for at least one of the services/bearers can be lowered by the re-negotiation, the achievable bitrate by using TTI bundling may be enough to fulfil the aggregated GBR requirements with regard to the re-negotiated GBR requirements.

Figure 1E:
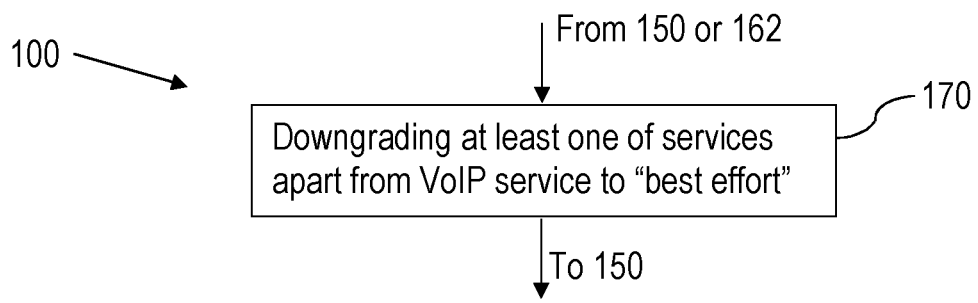
FIG. 1e is a flowchart of a method performed by a network node for supporting VoIP service of a wireless device, according to an exemplifying embodiment.

In an example illustrated in FIG. 1e, when the aggregated GBR requirements with regard to the re-negotiated GBR requirements is still higher than the achievable bitrate, the method comprises downgrading 170 at least one of the services which the wireless device is using apart from the VoIP service to "best effort", wherein the TTI bundling mode is determined to be enabled when the achievable bitrate is at least as high as the aggregated GBR requirement for the re-negotiated and downgraded GBR requirements. Merely as an example, assume that the wireless device is currently using VoIP and a Video service. The video service may in some cases be negotiated with a lower GBR requirement if the video rate is lowered. But if the wireless device is at the lowest supported GBR it might not, from a service perspective, be possible to re-negotiate the service type to best effort. However, the scheduler in the network node may treat the video service as best effort and focus on trying to keep the GBR for the VoIP service while in TTI bundling is used and not spend resources on trying to fulfil the GBR requirements of the video service.

By downgrading here is meant that the network node treats the bearer carrying at least one service other than the VoIP service as best effort. In this manner, e.g. for a certain SINR range as illustrated in FIG. 2 the estimated throughput without TTI bundling is less than with TTI bundling, it may still be possible to enable TTI bundling and still fulfil the aggregated GBR requirement.

By best effort, the network node does not provide any guarantees that data is delivered or that a user is given a guaranteed QoS level or a certain priority.

In yet an example, the predetermined threshold is associated with a hysteresis in order to avoid unnecessary switching of enabling/disabling TTI bundling.

When associating the predetermined threshold with a hysteresis, an "interval" for the threshold is defined. It means that if the channel quality of the channel between the wireless device and the network node is around the predetermined threshold so that it varies around the predetermined threshold, the channel quality is not considered crossing the threshold until it falls below the lower edge of the interval or goes above the upper edge of the interval defined by the associated hysteresis.

Figure 1F:
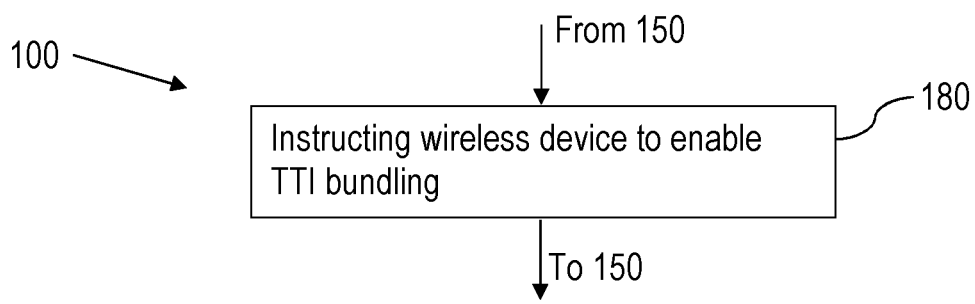
FIG. 1f is a flowchart of a method performed by a network node for supporting VoIP service of a wireless device, according to yet an exemplifying embodiment.

The method may further comprise, as illustrated in FIG. 1f, instructing 160 the wireless device to enable TTI bundling when it is determined to enable TTI bundling.

Before the wireless device may enable, or enter into, TTI bundling mode, it needs to be instructed by the network node to actually do so. Consequently, when the network node has determined to enable TTI bundling, the network node instructs the wireless device to enable TTI bundling.

Figure 3:
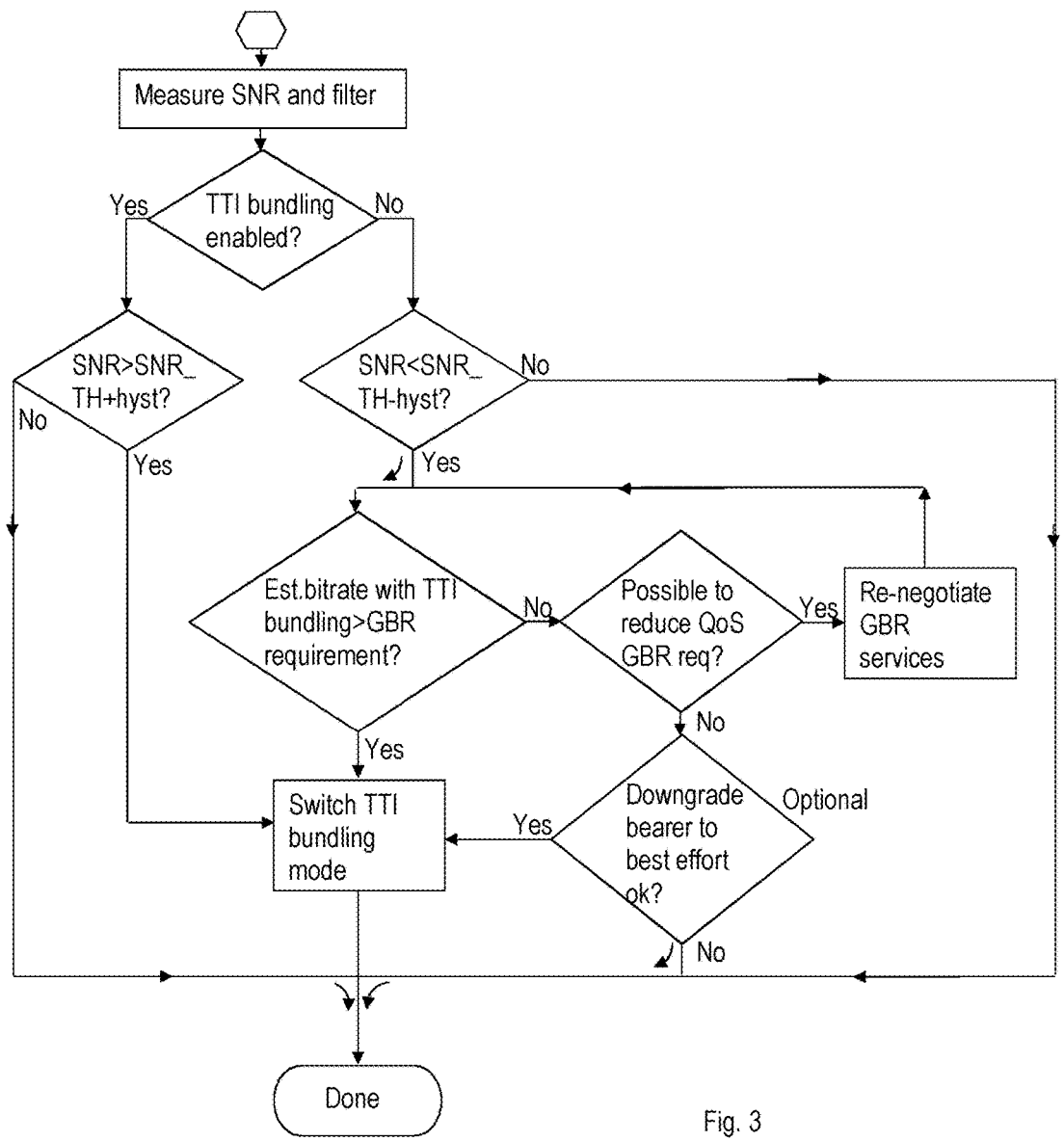
FIG. 3 is a flowchart of a method performed by a network node for supporting VoIP service of a wireless device, according to an exemplifying embodiment.

FIG. 3 is a flowchart of a method performed by a network node for supporting VoIP service of a wireless device, according to an exemplifying embodiment.

A wireless device currently involved in a VoIP service that experience bad radio conditions, e.g. low SNR or SINR, may make use of TTI bundling to be able to maintain the VoIP service in areas of poor network coverage. The bearer carrying the VoIP traffic is most commonly associated with a GBR bearer. A wireless device that has VoIP service running could also have other simultaneous services activated, e.g. conversational video or best effort data services. Since the usage of TTI bundling is quite resource consuming, it mostly makes sense to use TTI bundling for wireless devices that would benefit from TTI bundling. Another aspect is that the maximum throughput that the wireless device can achieve in uplink will be limited when having TTI bundling enabled. In some cases, the aggregated GBR requirements might exceed the maximum achievable bitrate with TTI bundling enabled as described above.

To determine if a VoIP wireless device may experience a gain from using TTI bundling or not, a switching algorithm based on filtered uplink SNR or SINR is described above. A wireless device having a low filtered SNR or SINR may be considered to improve the situation, i.e. improve the service quality, by switching to TTI bundling. However, switching to the TTI bundling mode may have serious consequences and drawbacks if not considering if the wireless device is able to maintain the aggregated GBR requirements that ongoing services for the wireless device have. The achievable bitrate for a wireless device with TTI bundling mode activated may be limited by the capability of the wireless device, that e.g. determine the maximum number of PRBs supported with TTI bundling enabled, and radio conditions, power limitations of the wireless device, etc. Since the maximum achievable bitrate may be heavily limited when TTI bundling is enabled, the VoIP wireless device can end up not fulfilling the quality of service requirements that the combined services are setting. This may lead to unsatisfied users and wasted system resources.

Since the channel conditions and capabilities of the wireless device are known, it is be possible to estimate the expected achievable bitrate with TTI bundling enabled before actually switching the TTI bundling mode. The bitrate estimation may then be compared to the aggregated GBR requirements that the user's services require, i.e. the services the user is using by means of the wireless device. It may not be considered resource efficient to switch the wireless device to TTI bundling enabled if the aggregated GBR requirements exceed the estimated achievable bitrate with TTI bundling enabled. One possible solution in this situation is to re-negotiate the GBR requirements, e.g. by downgrading or ending services that are considered as non-essential. Once this has been done, a new attempt to switch to TTI bundling may be performed. As a last optional resort, if there are no opportunities to downgrade or end any services that may reduce the GRB requirement, it may be possible to downgrade the GBR service to best effort before switching the user to TTI bundling. It shall be noted, that in the context of this disclosure, downgrading the GBR to best effort means that a scheduler in the network node will treat the GBR service as best effort.

In $3^{rd}$ Generation Partnership Project, 3GPP, release 9 of Long Term Evolution, LTE, TTI bundling is used, 4 TTIs is used to transmit the same payload data. This limits the maximum achievable throughput since the effective code rate will be reduced by a factor 4, as illustrated in FIG. 2 (dashed line). Also, since the maximum number of PRBs when TTI bundling is used this also helps to limit the achievable throughput. In FIG. 2 the throughput in some different modes are shown. The solid line represents the throughput for a normal wireless device, i.e. without TTI bundling. The maximum throughput is then reached when the maximum MCS and the maximum available throughput is used. For wireless devices capable of transmitting TTI bundling on larger bandwidths (i.e. after 3GPP release 11), the estimated throughput is increased to account for this, but due to the multiple transmissions of the same data the throughput will be lower compared to not using TTI bundling. The flow chart of FIG. 2 is showing the process of determining if a user can maintain QoS requirement before switching to TTI bundling enabled In FIG. 2 the small-dashed horizontal line corresponds to the aggregated GBR requirement. In this example this is higher than the achievable throughput with TTI bundling. Hence, by using TTI bundling the GBR can never be achieved (regardless of SINR) and unless the wireless device supports TTI bundling with more than 3 PRBs the GBR bitrate should be negotiated or TTI bundling should not be enabled for this wireless device.

When TTI bundling is not enabled and the filtered SNR or SINR falls below the predetermined threshold, modified by a hysteresis to avoid unnecessary TTI bundling mode switching, the estimated achievable bitrate with TTI bundling enabled is calculated and compared to the aggregated GBR requirements the user's ongoing services have. If the wireless device will be able to achieve at least the GBR requirement with TTI bundling enabled, the user is switched to TTI bundling enabled. If the wireless device is not able to meet the requirements, a check is made if GBR services not considered essential can be renegotiated. If this is possible, another attempt to see if the achievable bitrate exceeds the aggregated GBR requirements is done and so on. If it is not possible to achieve a lower GBR requirement by down grading or terminating non-essential services it would be possible to downgrade the GBR service to best effort before switching the user to TTI bundling enabled. This would give the user a better bitrate compared to not using TTI bundling but the system will not waste too many resources by running high priority scheduling due to unfulfilled QoS requirements.

Figure 4:
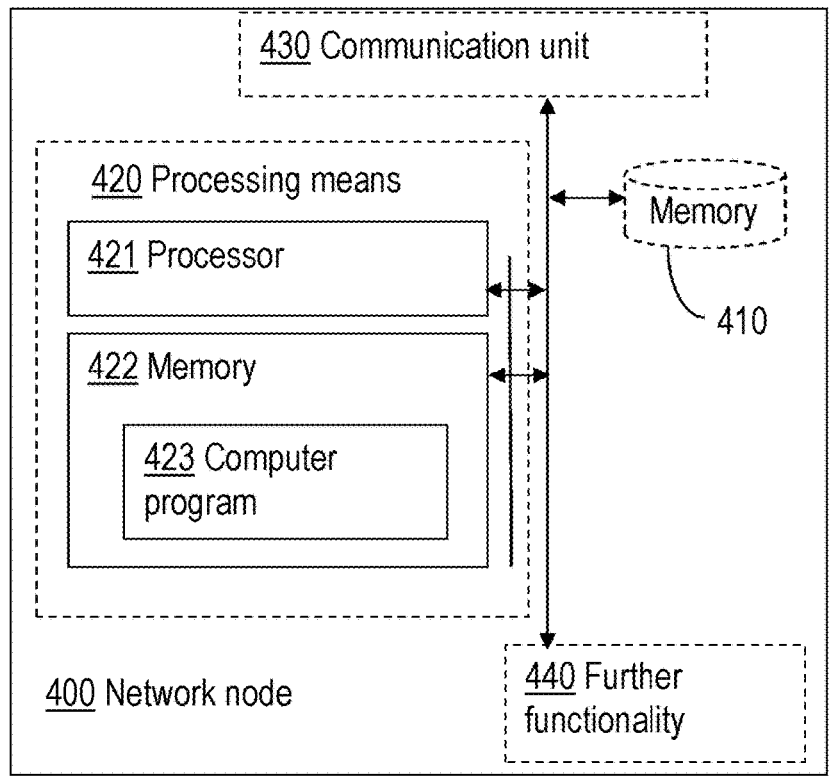
FIG. 4 is a block diagram of a network node configured for supporting VoIP service of a wireless device, according to an exemplifying embodiment.
Figure 5:
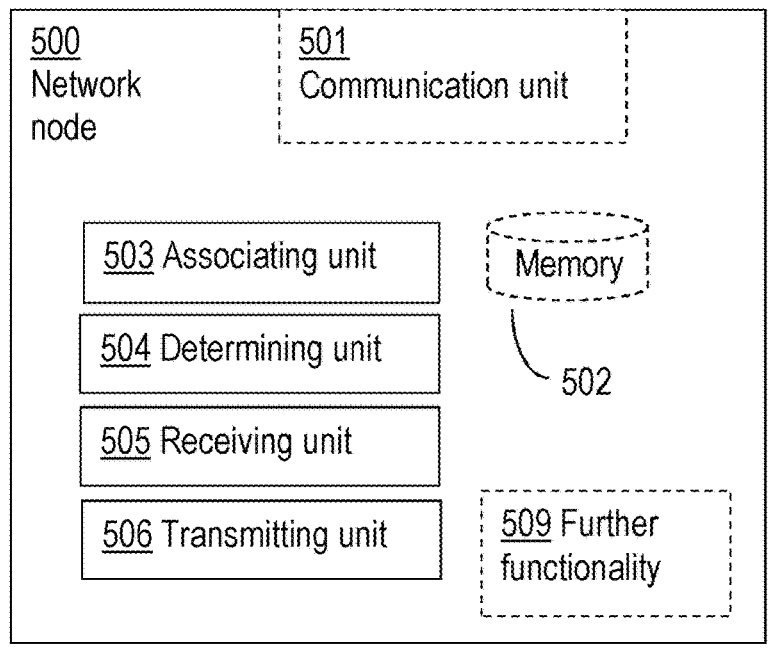
FIG. 5 is a block diagram of a network node configured for supporting VoIP service of a wireless device, according to yet an exemplifying embodiment.

Embodiments herein also relate to a network node for supporting a VoIP service of a wireless device, wherein the network node is operable in a wireless communication network. The network node has the same technical features, objects and advantages as the method performed by the network node. The network node will hence only be described in brief in order to avoid unnecessary repetition. The network node will be described, in brief, with reference to FIGS. 4 and 5, which are block diagram illustrating exemplifying embodiments of such a network node. FIGS. 4 and 5 illustrate the network node 400, 500 being configured for, when a channel quality of a channel between the wireless device and the network node falls below a predetermined threshold: determining aggregated Quality of Service, QoS, requirements with regard to Guaranteed Bit Rate, GBR, for services which the wireless device is currently using; determining an achievable bitrate using TTI bundling; and determining to enable TTI bundling of the wireless device based on the determined aggregated GBR requirement and the determined achievable bitrate.

The network node 400, 500 may be realised or implemented in various different ways. A first exemplifying implementation is illustrated in FIG. 4. FIG. 4 illustrates the network node 400 comprising a processor 421 and memory 422, the memory comprising instructions, e.g. by means of a computer program 423, which when executed by the processor 421 causes the network node 400 to, when a channel quality of a channel between the wireless device and the network node falls below a predetermined threshold: determine aggregated Quality of Service, QoS, requirements with regard to Guaranteed Bit Rate, GBR, for services which the wireless device is currently using; to determine an achievable bitrate using TTI bundling; and to determine to enable TTI bundling of the wireless device based on the determined aggregated GBR requirement and the determined achievable bitrate.

FIG. 4 also illustrates the network node 400 comprising a memory 410. It shall be pointed out that FIG. 4 is merely an exemplifying illustration and memory 410 may be optional, be a part of the memory 422 or be a further memory of the network node 400. The memory may for example comprise information relating to the network node 400, to statistics of operation of the network node 400, just to give a couple of illustrating examples. FIG. 4 further illustrates the network node 400 comprising processing means 420, which comprises the memory 422 and the processor 421. Still further, FIG. 4 illustrates the network node 400 comprising a communication unit 430. The communication unit 430 may comprise an interface through which the network node 400 communicates with other nodes or entities of the communication network. FIG. 4 also illustrates the network node 400 comprising further functionality 440. The further functionality 440 may comprise hardware of software necessary for the network node 400 to perform different tasks that are not disclosed herein.

An alternative exemplifying implementation of the network node 400, 500 is illustrated in FIG. 5. FIG. 5 illustrates the network node 500 comprising a determining unit 503 for, when a channel quality of a channel between the wireless device and the network node falls below a predetermined threshold: determining aggregated Quality of Service, QoS, requirements with regard to Guaranteed Bit Rate, GBR, for services which the wireless device is currently using; determining an achievable bitrate using TTI bundling; and determining to enable TTI bundling of the wireless device based on the determined aggregated GBR requirement and the determined achievable bitrate.

In FIG. 5, the network node 500 is also illustrated comprising a communication unit 501. Through this unit, the network node 500 is adapted to communicate with other nodes and/or entities in the wireless communication network. The communication unit 501 may comprise more than one receiving arrangement. For example, the communication unit 501 may be connected to both a wire and an antenna, by means of which the network node 500 is enabled to communicate with other nodes and/or entities in the wireless communication network. Similarly, the communication unit 501 may comprise more than one transmitting arrangement, which in turn is connected to both a wire and an antenna, by means of which the network node 500 is enabled to communicate with other nodes and/or entities in the wireless communication network. The network node 500 further comprises a memory 502 for storing data. Further, the network node 500 may comprise a control or processing unit (not shown) which in turn is connected to the different units 503-506. It shall be pointed out that this is merely an illustrative example and the network node 500 may comprise more, less or other units or modules which execute the functions of the network node 500 in the same manner as the units illustrated in FIG. 5.

It should be noted that FIG. 5 merely illustrates various functional units in the network node 500 in a logical sense. The functions in practice may be implemented using any suitable software and hardware means/circuits etc. Thus, the embodiments are generally not limited to the shown structures of the network node 500 and the functional units. Hence, the previously described exemplary embodiments may be realised in many ways. For example, one embodiment includes a computer-readable medium having instructions stored thereon that are executable by the control or processing unit for executing the method steps in the network node 500. The instructions executable by the computing system and stored on the computer-readable medium perform the method steps of the network node 500 as set forth in the claims.

The network node has the same possible advantages as the method performed by the network node as described above. One possible advantage is that it may be ensured that TTI bundling is only used when needed and when it is possible to fulfil service specific QoS requirements. Another possible advantage is that system resources may not be wasted on wireless devices that will fail to fulfil QoS requirements if switched to TTO bundling. In addition, highly prioritised services could be maintained of other, non-essential, services are degraded or terminated.

According to an embodiment, the network node is further configured for determining capabilities of the wireless device, wherein determining to enable TTI bundling of the wireless device is also based on the capabilities of the wireless device.

According to a further embodiment, the network node is further configured for determining at least one parameter out of BLER, MCS, supported number of PRBs, and power classification of the wireless device affecting the achievable bitrate, wherein determining to enable TTI bundling of the wireless device is also based on the determined at least one parameter.

According to yet an embodiment, determining to enable TTI bundling of the wireless device comprises determining the TTI bundling mode to be enabled when the achievable bitrate is at least as high as the aggregated GBR requirement.

According to still an embodiment, determining to enable TTI bundling of the wireless device comprises determining the TTI bundling mode to be enabled when the capabilities of the wireless device supports TTI bundling and optionally when the at least one parameter does not degrade the achievable bitrate to fall below the aggregated GBR requirement.

According to another embodiment, the network node is further configured for, when the achievable bitrate is below the aggregated GBR requirement, re-negotiating GBR requirements for at least one of the services which the wireless device is using apart from the VoIP service, determining aggregated GBR requirements for all services including the VoIP service with regard to the re-negotiated GBR requirements, wherein the TTI bundling mode is determined to be enabled when the achievable bitrate is at least as high as the aggregated GBR requirement for the re-negotiated GBR requirements.

According to yet an embodiment, wherein when the aggregated GBR requirements with regard to the re-negotiated GBR requirements is still higher than the achievable bitrate, the network node is configured for downgrading at least one of the services which the wireless device is using apart from the VoIP service to "best effort", wherein the TTI bundling mode is determined to be enabled when the achievable bitrate is at least as high as the aggregated GBR requirement for the re-negotiated and downgraded GBR requirements.

According to still an embodiment, the predetermined threshold is associated with a hysteresis in order to avoid unnecessary switching of enabling/disabling TTI bundling.

According to another embodiment, the network node is further configured for instructing the wireless device to enable TTI bundling when it is determined to enable TTI bundling.

Figure 6:
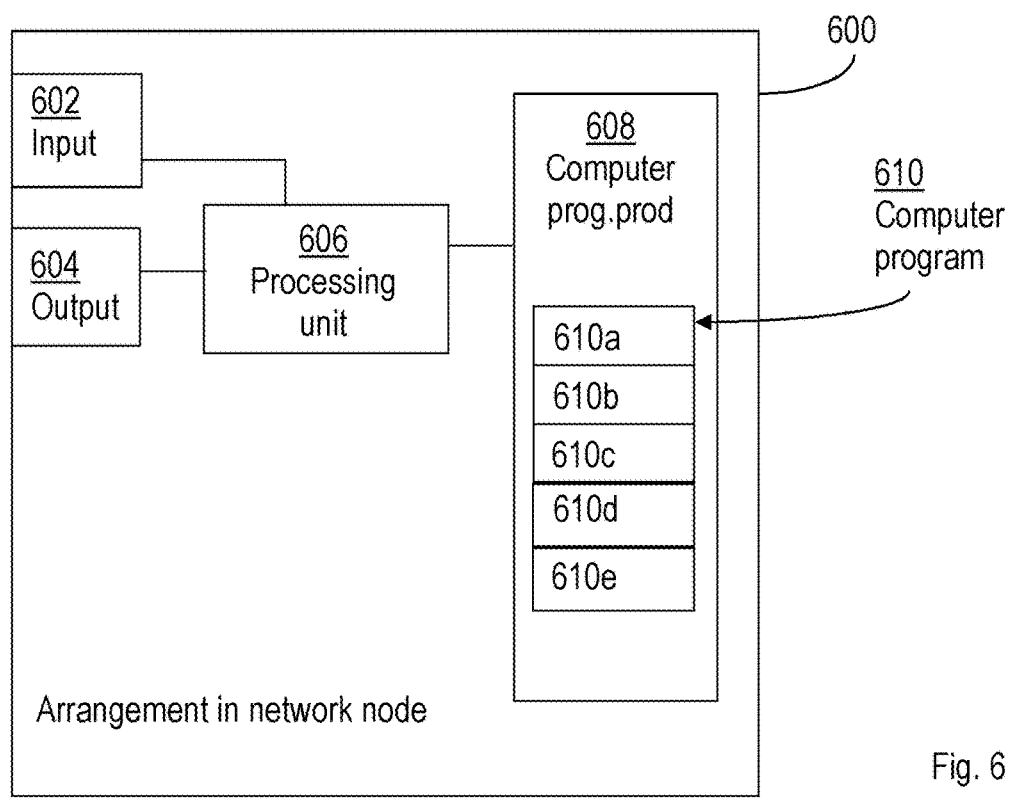
FIG. 6 is a block diagram of an arrangement in a network node configured for supporting VoIP service of a wireless device, according to an exemplifying embodiment.

FIG. 6 schematically shows an embodiment of an arrangement 600 in a network node 500. Comprised in the arrangement 600 in the network node 500 are here a processing unit 606, e.g. with a Digital Signal Processor, DSP. The processing unit 606 may be a single unit or a plurality of units to perform different actions of procedures described herein. The arrangement 600 of the network node 500 may also comprise an input unit 602 for receiving signals from other entities, and an output unit 604 for providing signal(s) to other entities. The input unit and the output unit may be arranged as an integrated entity or as illustrated in the example of FIG. 5, as one or more interfaces 501.

Furthermore, the arrangement in the network node 500 comprises at least one computer program product 608 in the form of a non-volatile memory, e.g. an Electrically Erasable Programmable Read-Only Memory, EEPROM, a flash memory and a hard drive. The computer program product 608 comprises a computer program 610, which comprises code means, which when executed in the processing unit 606 in the arrangement 600 in the network node 500 causes the first network node to perform the actions e.g. of the procedure described earlier in conjunction with FIGS. 1b-1f.

The computer program 610 may be configured as a computer program code structured in computer program modules 610a-610e. Hence, in an exemplifying embodiment, the code means in the computer program of the network node 500 comprises a determining unit, or module, for, when a channel quality of a channel between the wireless device and the network node falls below a predetermined threshold: determining aggregated Quality of Service, QoS, requirements with regard to Guaranteed Bit Rate, GBR, for services which the wireless device is currently using; determining an achievable bitrate using TTI bundling; and determining to enable TTI bundling of the wireless device based on the determined aggregated GBR requirement and the determined achievable bitrate.

The computer program modules could essentially perform the actions of the flow illustrated in FIGS. 1b-1f, to emulate the first network node 500. In other words, when the different computer program modules are executed in the processing unit 606, they may correspond to the unit 503 of FIG. 5.

Although the code means in the respective embodiments disclosed above in conjunction with FIG. 5 are implemented as computer program modules which when executed in the respective processing unit causes the network node to perform the actions described above in the conjunction with figures mentioned above, at least one of the code means may in alternative embodiments be implemented at least partly as hardware circuits.

The processor may be a single Central Processing Unit, CPU, but could also comprise two or more processing units. For example, the processor may include general purpose microprocessors; instruction set processors and/or related chips sets and/or special purpose microprocessors such as Application Specific Integrated Circuits, ASICs. The processor may also comprise board memory for caching purposes. The computer program may be carried by a computer program product connected to the processor. The computer program product may comprise a computer readable medium on which the computer program is stored. For example, the computer program product may be a flash memory, a Random-Access Memory RAM, Read-Only Memory, ROM, or an EEPROM, and the computer program modules described above could in alternative embodiments be distributed on different computer program products in the form of memories within the network node.

It is to be understood that the choice of interacting units, as well as the naming of the units within this disclosure are only for exemplifying purpose, and nodes suitable to execute any of the methods described above may be configured in a plurality of alternative ways in order to be able to execute the suggested procedure actions.

It should also be noted that the units described in this disclosure are to be regarded as logical entities and not with necessity as separate physical entities.

While the embodiments have been described in terms of several embodiments, it is contemplated that alternatives, modifications, permutations and equivalents thereof will become apparent upon reading of the specifications and study of the drawings. It is therefore intended that the following appended claims include such alternatives, modifications, permutations and equivalents as fall within the scope of the embodiments and defined by the pending claims.

The invention claimed is:

1. A method, performed by a network node, for supporting a Voice over IP (VoIP) service of a wireless device, the network node being operable in a wireless communication network, the method comprising, when a channel quality of a channel between the wireless device and the network node falls below a predetermined threshold:
   determining an aggregated Guaranteed Bit Rate (GBR) requirement for services which the wireless device is currently using;
   determining an achievable bitrate using Transmission Time Interval (TTI) bundling; and
   determining to enable TTI bundling of the wireless device based on the determined aggregated GBR requirement and the determined achievable bitrate,
   wherein the predetermined threshold is associated with a hysteresis in order to avoid unnecessary switching of enabling/disabling TTI bundling.

2. The method of claim 1:
   further comprising determining capabilities of the wireless device;

wherein the determining to enable TTI bundling of the wireless device is also based on the determined capabilities of the wireless device.

3. The method of claim 1:
further comprising determining at least one parameter out of the following affecting the achievable bitrate:
Block Error Rate;
Modulation and Coding Scheme supported number of Physical Resource Blocks; and
power classification of the wireless device;
wherein the determining to enable TTI bundling of the wireless device is also based on the determined at least one parameter.

4. The method of claim 1, wherein the determining to enable TTI bundling of the wireless device comprises determining a TTI bundling mode to be enabled when the achievable bitrate is at least as high as the aggregated GBR requirement.

5. The method of claim 3:
further comprising determining capabilities of the wireless device;
wherein the determining to enable TTI bundling of the wireless device comprises determining a TTI bundling mode to be enabled when:
the capabilities of the wireless device supports TTI bundling; and
the at least one parameter does not degrade the achievable bitrate to fall below the aggregated GBR requirement.

6. The method of claim 1, further comprising, when the achievable bitrate is below the aggregated GBR requirement:
re-negotiating GBR requirements for at least one of the services which the wireless device is using apart from the VoIP service;
determining aggregated GBR requirements for all services including the VoIP service with regard to the re-negotiated GBR requirements;
wherein the TTI bundling mode is determined to be enabled when the achievable bitrate is at least as high as the aggregated GBR requirement for the re-negotiated GBR requirements.

7. The method of claim 6, wherein, when the aggregated GBR requirements with regard to the re-negotiated GBR requirements is still higher than the achievable bitrate, the method comprises:
downgrading at least one of the services which the wireless device is using apart from the VoIP service to best effort,
wherein the TTI bundling mode is determined to be enabled when the achievable bitrate is at least as high as the aggregated GBR requirement for the re-negotiated and downgraded GBR requirements.

8. The method of claim 1, further comprising instructing the wireless device to enable TTI bundling when it is determined to enable TTI bundling.

9. A network node for supporting a Voice over IP (VoIP) service of a wireless device, the network node being operable in a wireless communication network, processing circuitry;
memory containing instructions executable by the processing circuitry whereby the network node is operative to, when a channel quality of a channel between the wireless device and the network node falls below a predetermined threshold:
determine an aggregated Guaranteed Bit Rate (GBR) requirement for services which the wireless device is currently using;
determine an achievable bitrate using Transmission Time Interval (TTI) bundling; and
determine to enable TTI bundling of the wireless device based on the determined aggregated GBR requirement and the determined achievable bitrate,
wherein the predetermined threshold is associated with a hysteresis in order to avoid unnecessary switching of enabling/disabling TTI bundling.

10. The network node of claim 9, wherein the instructions are such that the network node is operative to:
determine capabilities of the wireless device;
determine to enable TTI bundling of the wireless device also based on the determined capabilities of the wireless device.

11. The network node of claim 9, wherein the instructions are such that the network node is operative to:
determine at least one parameter out of the following affecting the achievable bitrate:
Block Error Rate,
Modulation and Coding Scheme supported number of Physical Resource Blocks; and
power classification of the wireless device;
determine to enable TTI bundling of the wireless device also based on the determined at least one parameter.

12. The network node of claim 9, wherein the instructions are such that the network node is operative to determine to a TTI bundling mode to be enabled when the achievable bitrate is at least as high as the aggregated GBR requirement.

13. The network node of claim 11, wherein the instructions are such that the network node is operative to:
determine capabilities of the wireless device;
determine to enable TTI bundling of the wireless device by determining the TTI bundling mode to be enabled when:
the capabilities of the wireless device supports TTI bundling; and
the at least one parameter does not degrade the achievable bitrate to fall below the aggregated GBR requirement.

14. The network node of claim 9, wherein the instructions are such that the network node is operative to, when the achievable bitrate is below the aggregated GBR requirement:
re-negotiate GBR requirements for at least one of the services which the wireless device is using apart from the VoIP service;
determine aggregated GBR requirements for all services including the VoIP service with regard to the re-negotiated GBR requirements;
wherein the TTI bundling mode is determined to be enabled when the achievable bitrate is at least as high as the aggregated GBR requirement for the re-negotiated GBR requirements.

15. The network node of claim 14, wherein the instructions are such that the network node is operative to, when the aggregated GBR requirements with regard to the re-negotiated GBR requirements is still higher than the achievable bitrate:
downgrade at least one of the services which the wireless device is using apart from the VoIP service to best effort;
wherein the TTI bundling mode is determined to be enabled when the achievable bitrate is at least as high as the aggregated GBR requirement for the re-negotiated and downgraded GBR requirements.

16. The network node of claim 9, wherein the instructions are such that the network node is operative to instruct the wireless device to enable TTI bundling when it is determined to enable TTI bundling.

17. A non-transitory computer readable recording medium storing a computer program product for controlling a network node supporting a Voice over IP (VoIP) service of a wireless device, the network node being operable in a wireless communication network, the computer program product comprising software instructions which, when run on processing circuitry of the network node, causes the network node to, when a channel quality of a channel between the wireless device and the network node falls below a predetermined threshold:
   determine an aggregated Guaranteed Bit Rate (GBR) requirement for services which the wireless device is currently using;
   determine an achievable bitrate using Transmission Time Interval (TTI) bundling; and
   determine to enable TTI bundling of the wireless device based on the determined aggregated GBR requirement and the determined achievable bitrate,
   wherein the predetermined threshold is associated with a hysteresis in order to avoid unnecessary switching of enabling/disabling TTI bundling.

* * * * *